J. B. MAAG.
Balance.
Patented April 22, 1835.
8794X
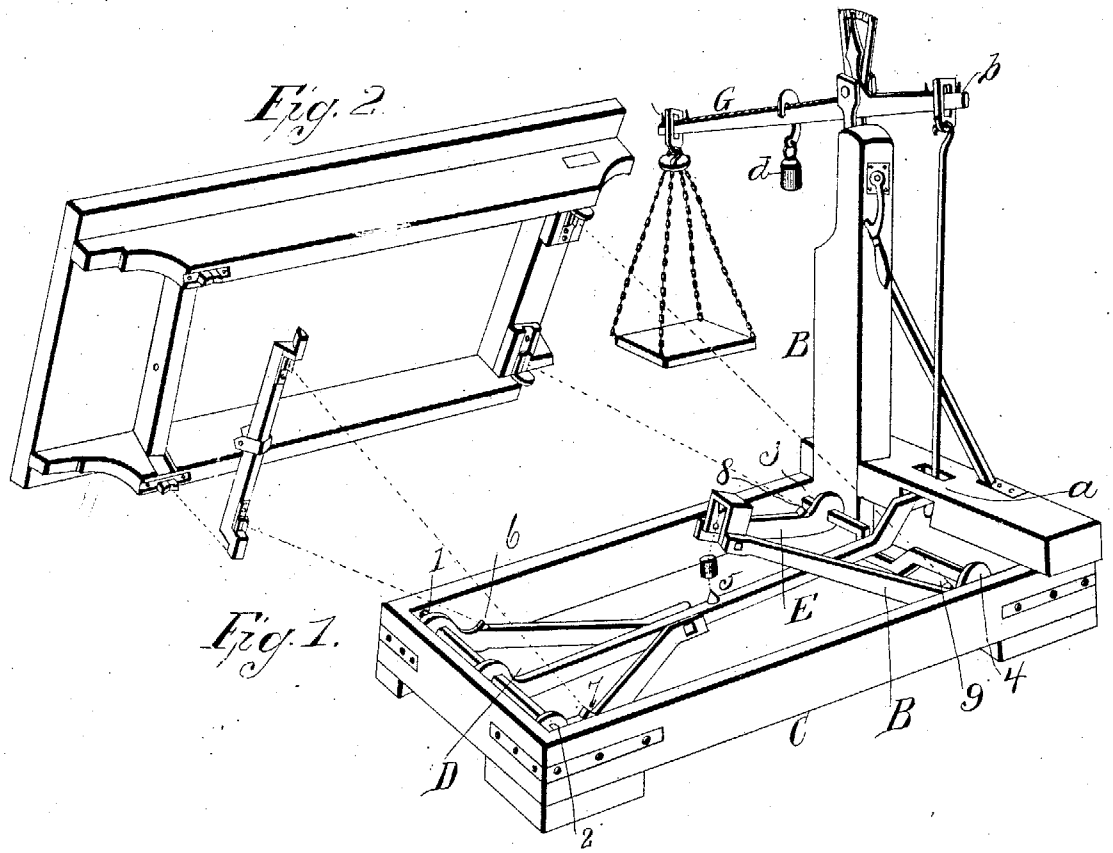

Apl 22. 1835

John G. Rohr Assignee of John B. Maag. of City of N. York.

Letters Patent.

The schedule referred to in these Letters Patent, and making part of the same,
containing a description in the words of the said John Baptiste Maag himself
of his improvement in the construction of balances or Weighing Machines To all to whom these presents shall come, Be it known that I John Baptiste Maag at present a resident of the City and
County of New York in the State of New York, and for more than two years last past
a resident of the United States of America, have invented a new and useful improve-
ment in the construction of Balances or Weighing Machines composed of several levers
combined in such proportions that a small weight is made to equipoise the sum of the velocities of
all the powers of such levers; that I have by a certain deed of assignment bearing date the
twelfth day of February in the year of our Lord one thousand eight hundred and thirty
five duly assigned transferred and set over unto John G. Rohr a citizen of the city of New
York in the state aforesaid, all my right, title and interest of in and to the aforesaid Im-
provement and every part thereof, and also all my right, title, interest, or claim to my Letters
Patent, to be issued or granted for or upon the improvement aforesaid. And that the follow-
ing is a full and exact description or specification of the construction of the said Balances
or Weighing Machines, together with my inventions and improvements therein, and of the man-
ner of using the same To wit.

Fig 1 A.B.C. of the accompanying draught or plan, represents a strong wooden frame upon
and within which the machinery is constructed. D.D. is a lever resting on knife shaped pins
of metal at 1 and 2. as a fulcrum, and by its other end resting on similar pieces of metal at-
tached to the connecting iron rod a.b. E.E. is another lever resting on similar pieces of metal
at 3. and 4 as a fulcrum and by its other end resting on the lever D. D. at 5.
the rectangular iron head piece of the lever E E. as shown at 5 has a pointed piece of steel
or other metal inserted in its under side. The lever D.D. has a similar piece of metal
inserted in its upper side (or edge) and between these two points there is placed a piece of metal
having a suitable cavity at each end, in which the two points aforesaid may act freely when
these are in their proper and exact position, there is screwed upon the upper edge of the lever D

30

8794X

Just back of the head piece aforesaid, a small iron cross bar projecting a little over the two parts of the lever EE, for the purpose of securing the piece of metal which forms the bearing piece of the two points aforesaid; This cross bar is however so adjusted, as also allow all the levers to move through the necessary space free from friction. There is inserted in each branch of the lever EE and in the two outside branches of the lever DD, a knife shaped piece of metal as shown at 6. 7. 8 & 9. Upon these pieces of metal the weighing Platform rests. —These four points are all equidistant (in the direction of the length of the frame) from the four points which form the fulcra of the two levers D.D & EE. And the point 5 is equidistant from the fulcra of the two levers aforesaid, so that any given weight resting on any one of the points 6. 7. 8. 9. or on all, or a part of them, in however different proportions, has the same effect at the point a in the connecting rod a.b. — G is a lever resting by its diagonal cross bar on suitable bearing pieces affixed to the upright B. The connecting rod a.b by means of a suitable opening in its upper end, (similar to the opening in its lower end) connects the short arm of the lever G, with the long arm of the lever DD in such a manner that when the nine points 1. 2. 3. 4. 5. 6. 7. 8. 9. and the point a are all in an exact horizontal plane, the two points a b. shall be exactly perpendicular and the points b. C. in the lever G. and the upper edge of the long arm of the lever G. shall be exactly horizontal. The upper edge of the long arm of this lever is made very thin and a weight d is so attached that by moving it, from or towards the fulcrum of the lever and weight resting on the platform is ascertained with the greatest precision, altho the weight on the platform may be an hundred or even a thousand times greater than that which is made to balance it. In place of the moveable weight, sometimes also is suspended a small platform, from a stationary point, on the end of the long arm aforesaid, and by adjusting small weights thereto the same effect is produced. The weighing platform is shown separately at Fig. 2. — The whole machine is so adjusted, that when the long arm of the lever G. is allowed to rise a proper distance, the platform (weighing platform) rests upon the upper side of the lower part of the wooden frame, thereby remaining firm and well sustained for the reception of the load to be weighed That which is claimed as an improvement and new invention is the peculiar combination of the two lower levers, whereby the power of both are united exactly in the central point 5. and increased at the point a the end of the lever D.D, and also the manner of connecting the two levers aforesaid by means of the <u>head piece</u> and double point, whereby all friction is avoided.

Witness  George [illegible]  
[illegible]

John B. [illegible]

[illegible]